US012405909B2

(12) United States Patent
Jain et al.

(10) Patent No.: US 12,405,909 B2
(45) Date of Patent: Sep. 2, 2025

(54) MANAGING WORKSPACES USING PRODUCTIVITY PROFILES

(71) Applicant: Dell Products, L.P., Round Rock, TX (US)

(72) Inventors: Shailesh Jain, Kalyan (IN); Michael S. Gatson, Austin, TX (US); Fnu Jasleen, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 124 days.

(21) Appl. No.: 18/325,152

(22) Filed: May 30, 2023

(65) Prior Publication Data

US 2024/0403249 A1  Dec. 5, 2024

(51) Int. Cl.
*G06F 13/38* (2006.01)

(52) U.S. Cl.
CPC .................................. *G06F 13/385* (2013.01)

(58) Field of Classification Search
CPC ....................................................... G06F 13/385
See application file for complete search history.

(56) References Cited

U.S. PATENT DOCUMENTS

| 6,832,271 | B1* | 12/2004 | Ivan | H04L 41/22 |
| | | | | 715/737 |
| 10,938,743 | B1* | 3/2021 | Andrews | H04L 47/822 |
| 11,410,267 | B1* | 8/2022 | Gatson | H04L 67/52 |
| 2022/0292178 | A1* | 9/2022 | Iyer | G06F 21/31 |
| 2022/0309146 | A1* | 9/2022 | Iyer | G06F 21/45 |
| 2022/0350660 | A1* | 11/2022 | Gatson | G06F 9/3891 |
| 2023/0074802 | A1* | 3/2023 | Comer | G06F 9/5044 |
| 2023/0236632 | A1* | 7/2023 | Lukanc | G06F 8/65 |
| | | | | 361/679.41 |
| 2024/0354264 | A1* | 10/2024 | Ragavan | G06F 13/102 |

* cited by examiner

*Primary Examiner* — Henry Tsai
*Assistant Examiner* — Aurangzeb Hassan
(74) *Attorney, Agent, or Firm* — Fogarty LLP (57) ABSTRACT

Systems and methods for managing workspaces using productivity profiles are described. In an embodiment, an Information Handling System (IHS) may include a processor and a memory coupled to the processor, the memory having program instructions stored thereon that, upon execution, cause the IHS to: send a user's productivity profile to a remote service, where the productivity profile is created based, at least in part, upon a utilization of a peripheral device when the IHS is deployed in a first workspace; and receive, from the remote service, a recommendation to deploy the IHS in a selected workspace, where the recommendation is produced based, at least in part, upon a comparison between the user's productivity profile and a set of capabilities of the selected workspace.

20 Claims, 6 Drawing Sheets

MANAGING WORKSPACES USING PRODUCTIVITY PROFILES

FIELD

This disclosure relates generally to Information Handling Systems, and, more specifically, to systems and methods for managing workspaces using productivity profiles.

BACKGROUND

As the value and use of information continues to increase, individuals and businesses seek additional ways to process and store it. One option available to users is an Information Handling System (IHS). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated.

Variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

SUMMARY

Systems and methods for managing workspaces using productivity profiles are described. In an illustrative, non-limiting embodiment, an Information Handling System (IHS) may include a processor and a memory coupled to the processor, the memory having program instructions stored thereon that, upon execution, cause the IHS to: send a user's productivity profile to a remote service, where the productivity profile is created based, at least in part, upon a utilization of a peripheral device when the IHS is deployed in a first workspace; and receive, from the remote service, a recommendation to deploy the IHS in a selected workspace, where the recommendation is produced based, at least in part, upon a comparison between the user's productivity profile and a set of capabilities of the selected workspace.

The peripheral device may include at least one of: a docking station, a display, a projector, a camera, a microphone, a loudspeaker, headphones, a keyboard, a mouse, a scanner, a printer, or a tablet. The program instructions, upon execution, may cause the IHS to monitor the utilization of the peripheral device via a port selected from the group consisting of: Universal Serial Bus (USB) Type-A, USB Type-B, USB Type-C, Lightning, Firewire, Thunderbolt, DisplayPort, High-Definition Multimedia Interface (HDMI), Digital Visual Interface (DVI), and Serial Advanced Technology Attachment (SATA).

The first workspace may include the user's home, and the selected workspace may be selected among a plurality of a work desks, offices, rooms, or cubicles.

The program instructions, upon execution, further cause the IHS to monitor the utilization of the peripheral device via a composite peripheral device including a plurality of ports. For example, the composite peripheral device may include at least one of: a docking station, a display, or a hub.

The program instructions, upon execution, may cause the IHS to, in response to the peripheral device being utilized above a threshold, add an indication of the utilization to the user's productivity profile.

In response to an indication in the user's productivity profile that the utilization of the peripheral device is above a threshold amount, the selected workspace may have an instance of the peripheral device. Additionally, or alternatively, in response to an indication in the user's productivity profile that the utilization of the peripheral device is not above a threshold amount, the selected workspace may not have an instance of the peripheral device. Additionally, or alternatively, in response to an indication in the user's productivity profile that the peripheral device is utilized with a given setting, the selected workspace may have an alternate peripheral device with the given setting. For instance, the given setting may include a display resolution.

The program instructions, upon execution, may cause the IHS to, in response to an indication that: (i) the peripheral device is utilized with a setting, and (ii) the selected workspace does not have another instance of the peripheral device nor an alternate peripheral device with the setting, receive a recommendation to change a configuration of the selected workspace.

In another illustrative, non-limiting embodiment, a method may include: receiving, at a remote service from an IHS, a user's productivity profile created based, at least in part, upon a user's utilization of a peripheral device when the IHS is deployed in a first workspace; and providing, from the remote service to the user, a recommendation to deploy the IHS in a selected workspace, where the recommendation is produced based, at least in part, upon a comparison between the user's productivity profile and a set of capabilities of the selected workspace.

In response to the peripheral device utilization meeting a high-utilization criteria, the peripheral device may be indicated as belonging to a primary productivity profile. Additionally, or alternatively, in response to the peripheral device utilization not meeting the high-utilization criteria but meeting a low-utilization criteria, the peripheral device may be indicated as belonging to a secondary productivity profile.

The workspace may be chosen based, at least in part, upon whether the selected workspace matches the primary productivity profile, and, if not, whether the selected workspace matches the secondary productivity profile.

In yet another illustrative, non-limiting embodiment, a memory storage device may have program instructions stored thereon that, upon execution by a processor, cause the processor to: create a user's productivity profile based, at least in part, upon the user's utilization of a peripheral device when an IHS is deployed in a first workspace; and handle a recommendation that the IHS be deployed in a selected one of a plurality of workspaces, where the recommendation is produced based, at least in part, upon a comparison between the user's productivity profile and sets of capabilities of each of the plurality of workspaces.

In response to the peripheral device utilization meeting a high-utilization criteria, the peripheral device may be indicated as belonging to a primary productivity profile. Additionally, or alternatively in response to the peripheral device utilization not meeting the high-utilization criteria but meeting a low-utilization criteria, the peripheral device may be indicated as belonging to a secondary productivity profile. The recommendation may be produced based, at least in part, upon whether the selected workspace matches the primary productivity profile, and, if not, whether the selected workspace matches the secondary productivity profile.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

DETAILED DESCRIPTION

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price.

An IHS may include random access memory (RAM), one or more processing resources such as a central processing unit (CPU) or hardware or software control logic, ROM, and/or other types of nonvolatile memory. Additional components of an IHS may include one or more disk drives, one or more network ports for communicating with external devices as well as various input and output (I/O) devices, such as a keyboard, a mouse, touchscreen and/or a video display. An IHS may also include one or more buses operable to transmit communications between the various hardware components. A more detailed example of an IHS is described with respect to FIG. 1. It should be appreciated that although certain embodiments are discussed in the context of a personal computing device, other embodiments may utilize other types of IHSs.

In the context of IHSs, each workspace (e.g., an office, a conference room, a home office, a shared workspace, etc.) may include its own distinct set of peripheral devices (e.g., an external camera or webcam, an external microphone, an external speaker, a keyboard, a mouse, a printer, etc.). When a user (or employee) arrives at a workspace, they may bring their IHSs into the workspace and then choose between using: (a) peripheral devices integrated into their IHS, or (b) external peripheral devices found in that workspace.

In some cases, when a user arrives at a particular workspace, they may couple their IHS to one or more peripheral devices via a Workspace Managing Device (WMD) such as a dock, docking station, intelligent hub, external display, wireless KVM, or other IHS. Additionally, or alternatively, the IHS may be directly coupled to one or more peripheral devices using any suitable wired or wireless communication protocol. Yet additionally, or alternatively, a workspace may be served by one of a plurality of distributed Access Points (APs) for network/Internet connectivity, such as wireless routers or the like.

In the modern enterprise, a hybrid workplace model combines office and remote work to offer flexibility and support to employees. Under the model, employees carry their IHSs to and from the office, and directly connect any peripheral devices (e.g., monitor, keyboard, mouse, docks, etc.) available in their current workspace.

The inventors hereof have determined that, in a hybrid workspace model, it is important for the user moving across home and office environments to get the same working experience irrespective of their location for continued productivity.

For example, a user may utilize a dual monitor setup at home with span mode, but when the user goes to the office, they may have access to a single monitor instead. Once the user reaches the office workspace, they connect their IHS to the workspace's dock, which adapts his environment to single monitor use, and the user's dual monitor productivity preference is not taken into consideration.

To illustrate further, consider a first hypothetical scenario where a user moves between home and office workspaces and has the same set of peripherals available in each workspace, but with different settings or configurations. For example, the user may have a 4k external display in their home workspace, but the external display in their office workspace may have a maximum resolution of 1920× 1080—which could affect their productivity.

In this case, systems and methods described herein may let the user know whether they can continue to be productive in the office with a lower resolution display, or whether they should request a 4k display. Moreover, these systems and methods may be automated to avoid productivity loss when the user is connected to the office environment.

In a second hypothetical scenario, the user may have a greater number of peripheral devices available in a first workspace (e.g., home) than in a second workspace (e.g., office). For instance, the user may utilize an external camera at home setup for video calls, but there is no external camera in their office such that to participate in video calls from the office the user must use a single monitor set up.

In this case, systems and methods described herein may let the user know if they can continue to be productive with a single monitor and no external camera, or whether they should request a dual monitor and/or an external camera. Again, these systems and methods may be automated to avoid productivity losses.

In a third hypothetical scenario, the user may have alternate arrangements for selected peripherals. For example, the user may utilize an external speaker at home, but a BLUETOOTH headset in the office.

In this case, systems and methods described herein may be used to automatically adapt the IHS's configuration to work with the speakers at home, and to switch to the wireless headset in the office, and vice-versa.

Accordingly, in various embodiments, systems and methods described herein may provide intelligent management of workspaces using productivity profiles. The user's productivity profile and/or preferences may be automatically adapted for hybrid work setup to suit the user's requirements. These systems and methods may identify a user's work pattern in term of peripherals' utilization or usage with corresponding priorities, and may produce a productivity profile that can adapt to various workspaces, thus enabling business continuity and allowing the user to spend less time setting up their IHS and workspaces.

In each of the aforementioned scenarios, to prevent the user from continuing to use low performing ports, reconnecting low performing peripheral devices through trial-and-error, and/or having to become more technical about the peripheral devices, these systems and methods may provide an Operating System (OS) (e.g., WINDOWS, MACOS, IOS, ANDROID, LINUX, etc.), peripheral device, communication port, and protocol-independent framework for automatically managing workspaces using productivity profiles.

Figure 1:
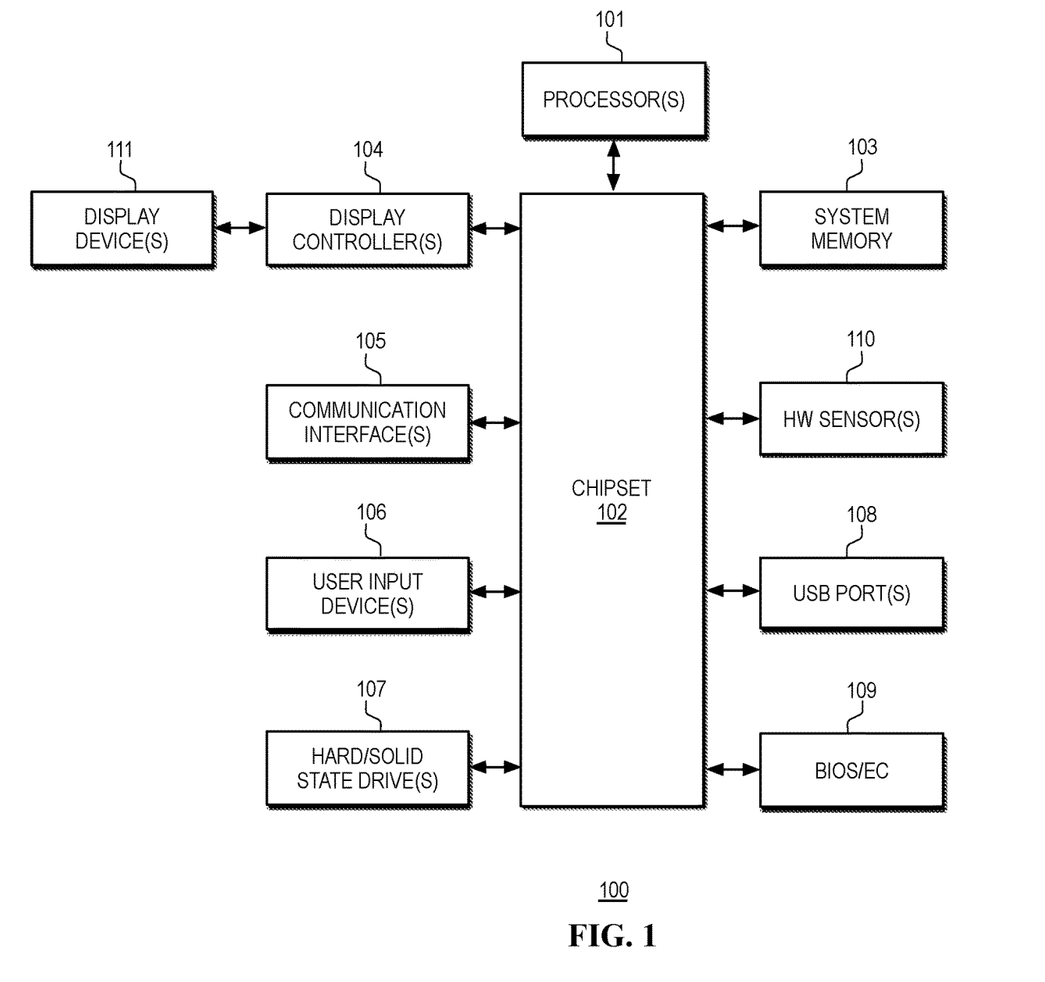
FIG. 1 depicts a block diagram of examples of components of an Information Handling System (IHS), according to some embodiments.

FIG. 1 is a block diagram of components of IHS 100, according to some embodiments. As depicted, IHS 100 includes processor 101. In various embodiments, IHS 100 may be a single-processor system, or a multi-processor system including two or more processors. Processor 101 may include any processor capable of executing program instructions, such as a PENTIUM series processor, or any general-purpose or embedded processors implementing any of a variety of Instruction Set Architectures (ISAs), such as an x86 ISA or a Reduced Instruction Set Computer (RISC) ISA (e.g., POWERPC, ARM, SPARC, MIPS, etc.).

IHS 100 includes chipset 102 coupled to processor 101. Chipset 102 may provide processor 101 with access to several resources. In some cases, chipset 102 may utilize a QuickPath Interconnect (QPI) bus to communicate with processor 101. Chipset 102 may also be coupled to communication interface(s) 105 to enable communications between IHS 100 and various wired and/or wireless networks, such as Ethernet, WIFI, BLUETOOTH (BT), cellular or mobile networks (e.g., Code-Division Multiple Access or "CDMA," Time-Division Multiple Access or "TDMA," Long-Term Evolution or "LTE," etc.), satellite networks, or the like. In some cases, communication interface(s) 105 may be used to communicate with peripheral devices (e.g., displays, speakers, microphones, headsets, docking stations, printers, etc.). Moreover, communication interface(s) 105 may be coupled to chipset 102 via a Peripheral Component Interconnect Express (PCIe) bus, or the like.

Chipset 102 may be coupled to display controller(s) 104, which may include one or more or graphics processor(s) (GPUs) on a graphics bus, such as an Accelerated Graphics Port (AGP) or PCIe bus. As shown, display controller(s) 104 provide video or display signals to display device 111. In other implementations, any number of display controllers or display devices may be used.

Display device 111 may include Liquid Crystal Display (LCD), Light Emitting Diode (LED), organic LED (OLED), or other thin film display technologies. Display device 111 may include a plurality of pixels arranged in a matrix, configured to display visual information, such as text, two-dimensional images, video, three-dimensional images, etc. In some cases, display device 111 may be provided as two or more discrete displays.

Chipset 102 may provide processor 101 and/or display controller(s) 104 with access to system memory 103. In various embodiments, system memory 103 may be implemented using any suitable memory technology, such as static RAM (SRAM), dynamic RAM (DRAM) or magnetic disks, or any nonvolatile/Flash-type memory, such as a solid-state drive (SSD) or the like. Memory 103 may store program instructions that, upon execution by processor 101, enable the instantiation of an intelligent workspace connection assistant, as described in more detail below.

Chipset 102 may also provide access to one or more hard disk and/or solid-state drives 107. In certain embodiments, chipset 102 may also provide access to one or more optical drives or other removable-media drives. In certain embodiments, chipset 102 may provide access to one or more USB ports 108, to which one or more peripheral devices may be coupled (e.g., internal or external webcams, microphones, speakers, docking stations, displays, etc.).

Chipset 102 may further provide access to one or more user input devices 106, for example, using a super I/O controller or the like. Examples of user input devices 106 include, but are not limited to, a keyboard, mouse, touchpad, stylus or active pen, dial totem, etc. Each of user input devices 106 may include a respective controller (e.g., a touchpad may have its own touchpad controller) that interfaces with chipset 102 through a wired or wireless connection (e.g., via communication interfaces(s) 105).

In certain embodiments, chipset 102 may also provide an interface for communications with one or more hardware (HW) sensors 110. Sensors 110 may be disposed on or within the chassis of IHS 100, and may include, but are not limited to: electric, magnetic, radio, optical, infrared, thermal, force, pressure, acoustic, ultrasonic, proximity, position, deformation, bending, direction, movement, velocity, rotation, and/or acceleration sensor(s).

Upon booting of IHS 100, processor(s) 101 may utilize Basic Input/Output System (BIOS) instructions of BIOS/Embedded Controller (EC) 109 to initialize and test hardware components coupled to IHS 100 and to load an OS for use by IHS 100. BIOS 109 provides an abstraction layer that allows the OS to interface with certain hardware components that are utilized by IHS 100. Via the hardware abstraction layer provided by BIOS 109, software stored in system memory 103 and executed by processor 101 can interface with certain I/O devices that are coupled to IHS 100. The Unified Extensible Firmware Interface (UEFI) was designed as a successor to BIOS. As a result, many modern IHSs utilize UEFI in addition to or instead of a BIOS. As used herein, BIOS 109 is intended to also encompass a UEFI component.

EC 109 may be installed as a Trusted Execution Environment (TEE) component to the motherboard of IHS 100. EC 109 may implement operations for interfacing with a power adapter in managing power for IHS 100. Such operations may be utilized to determine the power status of IHS 100, such as whether IHS 100 is operating from battery power or is plugged into an AC power source. Firmware instructions utilized by EC 109 may be used to provide various core operations of IHS 100, such as power management and management of certain modes of IHS 100 (e.g., turbo modes, maximum operating clock frequencies of certain components, etc.).

EC 109 may be further configured to calculate hashes or signatures that uniquely identify individual components of IHS 100. In such scenarios, EC 109 may calculate a hash value based on the configuration of a hardware and/or software component coupled to IHS 100. For instance, EC 109 may calculate a hash value based on all firmware and other code or settings stored in an onboard memory of a hardware component. Such hash values may be calculated as part of a trusted process of manufacturing IHS 100 and may be maintained in secure storage as a reference signature. EC 109 may later recalculate the hash value for a component may compare it against the reference hash value to determine if any modifications have been made to the component, thus indicating that the component has been compromised. In this manner, EC 109 may validate the integrity of hardware and software components installed on IHS 100.

In other embodiments, IHS 100 may not include all the components shown in FIG. 1. In other embodiments, IHS 100 may include other components in addition to those that are shown in FIG. 1. Furthermore, some components that are represented as separate components in FIG. 1 may instead be integrated with other components. For example, all or a portion of the operations executed by the illustrated components may instead be provided by components integrated into processor(s) 101 as systems-on-a-chip (SoC). As such, in certain embodiments, IHS 100 may be implemented as different classes of computing devices including, but not limited to: servers, workstations, desktops, laptops, appliances, video game consoles, tablets, smartphones, etc.

Figure 2:
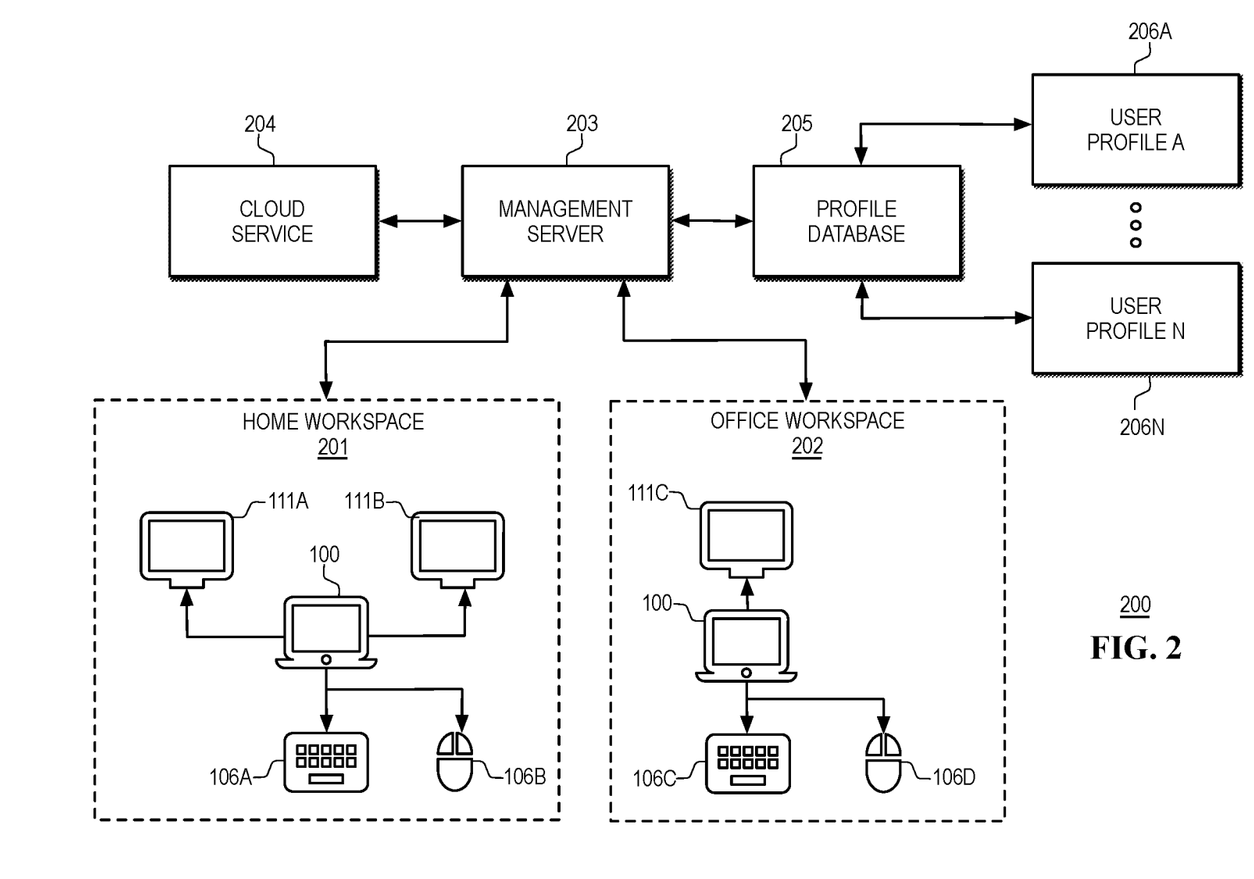
FIG. 2 depicts a block diagram of an example of an architecture for managing workspaces using productivity profiles, according to some embodiments.

FIG. 2 depicts a block diagram of an example of architecture 200 for managing workspaces using productivity profiles. As shown, an IHS user (e.g., the employee of an enterprise with hybrid work arrangements, etc.) may operate IHS 100 in home workspace 201 and/or office workspace 202.

When in workspace 201, IHS 100 has access to dual displays 111A and 111B, as well as keyboard 106A and mouse 106B. Conversely, when in office workspace 202, IHS 100 has access to single display 111C, keyboard 106C, and mouse 106D.

Both home and office workspaces 201 and 202 may be in communication with remote management server 203 (e.g., via the Internet) configured to manage workspaces using productivity profiles, as described in more detail below. Management server 203 may be in communication with cloud service 204 and user productivity profile database 205, which stores profiles 206A-N.

In operation, IHS 100 registers with management server 203 and monitors the user's utilization of various peripheral devices in a given workspace (e.g., home workspace 201). IHS 100 publishes a user's productivity profile to management server 203, which saves the profile in database 205. When IHS 100 connects to management server 203 from another workspace (e.g., office workspace 202), it may publish the capabilities (e.g., peripheral devices, configurations, etc.) of that workspace as well.

Management server 203 may then communicate with cloud service 204 to generate a workspace recommendation (e.g., for the user to move to a different workspace, to procure a certain peripheral to replace or be added to the other workspace, to remove an unnecessary peripheral from the other workspace, etc.). Once the workspace recommendation is produced, IHS 100 may retrieve an applicable productivity profile and it may apply it to its current workspace.

Figure 3:
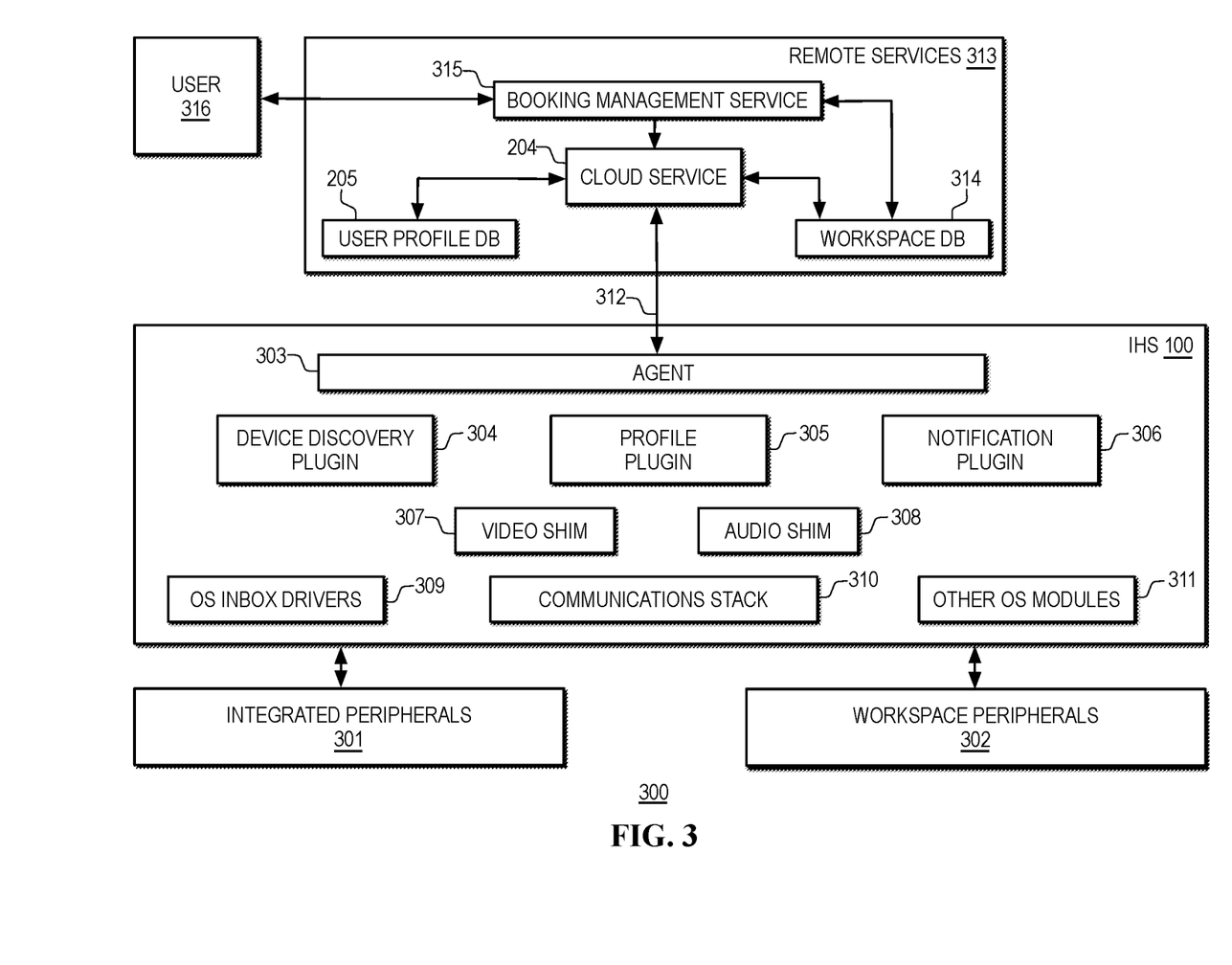
FIG. 3 depicts a block diagram of an example of a system for managing workspaces using productivity profiles, according to some embodiments.

FIG. 3 depicts a block diagram of an example of system 300 for managing workspaces using productivity profiles. In some embodiments, system 300 may include IHS 100 coupled to IHS-integrated peripheral devices 301 and to external, workspace peripherals 302. To enable the management of workspaces using productivity profiles, IHS 100 may also be coupled to remote services (or "backend") 313 via Application Programming Interface (API) 312 (e.g., a REpresentational State Transfer or "REST" API, or the like), over a network (e.g., the Internet).

Within IHS 100, a kernel space may include: OS inbox drivers 309, communications stack 310, and other OS modules 311. Moreover, a user space overlaying the kernel space may include: agent 303, device discovery plugin 304, profile plugin 305, notification plugin 306, video shim module 307, and audio shim module 308.

Agent 303 may be responsible for loading other plugins and modules, and for handling all incoming and outgoing events from and to cloud service 204.

Device discovery plugin 304 may be responsible for discovering the devices connected to a workspace (static and dynamically connected peripherals). Profile plugin 305 may be responsible for identifying user profiles containing peripherals utilized with usage duration, as well as user preferences, settings, configurations, priorities, and other data usable in the management of workspaces.

Notification plugin 306 may be responsible for handling notifications to the user of IHS 100. Video shim module 307 and audio shim module 308 may be configured to handle peripheral device-level abstractions, including any composite devices (e.g., docks, hubs, etc.).

Within remote services 313, cloud service 204 is coupled to user productivity profile database 205, workspace database 314, and booking management service 315. In some cases, user 316 may connect to booking management service 315 (e.g., using IHS 100) to schedule or reserve one or more available workspaces (e.g., within an office building). Cloud service 204 may be configured to select or identify a user productivity profile for use based upon data published by agent 303, and to generate workspace recommendations (e.g., a different workspace, to add, procure, or replace a device, to remove an unnecessary device, etc.).

Figure 4:
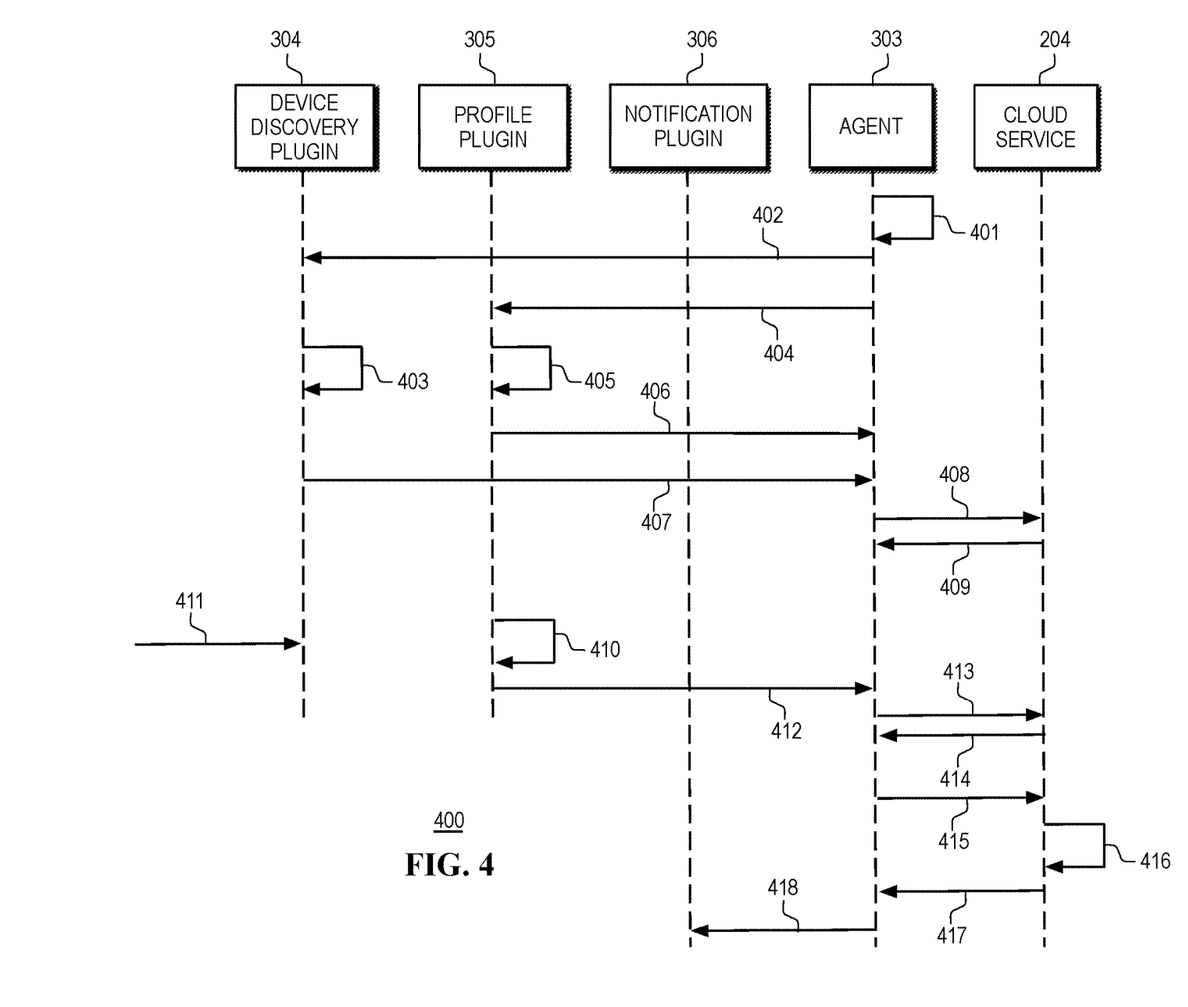
FIG. 4 depicts a sequence diagram of an example of a method for managing workspaces using productivity profiles, according to some embodiments.

FIG. 4 depicts a sequence diagram of an example of method 400 for managing workspaces using productivity profiles. Particularly, in this example, agent 303 starts at 401 and loads all other plugins and modules, and it sends command or message 402 to device discovery plugin 304 to discover devices in the workspace where IHS 100 is disposed. At 403, device discovery plugin 304 discovers the devices available in the workspace (e.g., using video shim 307 and/or audio shim 308).

Agent 303 also sends another command or message 404 to profile plugin 305 to discover connections in the workspace, enumerate the list of connected peripherals with their current configuration settings, monitor the utilization of each peripheral (e.g., duration), prioritize the peripherals by order of duration (e.g., descending), and store those values in a productivity profile for the user.

At 405, profile plugin 305 discovers connections in the workspace and at 406 it sends agent 303 a command or message indicating the discovered connection information. Similarly, at 407, device discovery plugin 304 sends discovered device information to agent 303.

At 408, agent 303 sends connection and/or device information to cloud service 204, and it receives an acknowledgement or success indication at 409. At 410, profile plugin 305 monitors peripheral utilization and creates or updates a productivity profile for the user.

If at 411 there is a change to the workspace (e.g., a new device connection, a device disconnection, etc.), operation(s) 410 may be repeated such that, for example, profile plugin 305 may start monitoring the utilization of that peripheral (e.g., duration, last usage time, last configuration, port(s) used, etc.). At 412, profile plugin 305 may send the profile to agent 303.

At 413, agent 303 may send the profile to cloud service 204, for example, upon request by cloud service 204 and/or at a regular check-in interval. Cloud service 204 may store the profile in user profile database 205. At 414, cloud service 204 may send an acknowledgement to agent 303. If there are any workspace changes (e.g., as determined in 411), then at 415 agent 303 may notify cloud service 204 of the change.

At 416 cloud service 204 may trigger a workspace recalculation operation, and at 417 it may send a workspace recommendation to agent 303. For example, the recommendation may prioritize peripherals in descending order of usage duration supplemented with usage frequency and last time of use, for instance, using an Artificial Intelligence (AI) or Machine Learning (ML) algorithm (e.g., K-Nearest Neighbor or "k-NN"). These recommendations may be sent or displayed to the user or Information Technology (IT) personnel as notifications (e.g., dialog boxes in the IHS's Graphical User Interface or "GUI," emails, etc.) using notification plugin 306 at 418.

In some cases, the top N peripherals used for the longest duration and/or most recently used may be marked as constituting a "Bare Metal Productivity Profile" (e.g., [monitor: 8 hrs, keyboard: 8 hrs, mouse: 6 hrs]). Additionally, or alternatively, peripherals used from longest to shortest duration and/or rarely used may be marked as belonging to "Best Productivity Profile" (e.g., [monitor: 8 hrs, keyboard: 8 hrs, mouse: 6 hrs, camera: 1 hr]).

When the user reserves a workspace via booking management service 315, cloud service 204 may check if a set of capabilities of the selected workspace (e.g., retrieved from workspace database 314) meets the user's Best Productivity Profile requirements. If no match is found, cloud service 204 may check if the selected workspace's capabilities meet the user's Bare Metal Productivity Profile requirements. If no match is found, cloud service 204 may attempt to reserve or suggest an alternate workspace better suited to the user's productivity profile.

To illustrate the foregoing, consider the following non-limiting example of a user productivity profile, here provided in JavaScript Object Notation (JSON) format:

```
{
"username": "Bob",
"peripherals": {
"monitors": [
{
"description": "Monitor-1",
"usage duration": 120,
"inuse": true,
"External": true,
"Lastused" : "2023-02-01 09:01:15"
"capabilities": {
"Maxresolution": "1920*1080",
"Selresolution": "1920*1080",
"orientation": "Landscape"
}
},
{
"description": "Monitor-2",
"usage duration": 0,
"inuse": false,
"external": true,
"capabilities": {
"maxresolution": "3840*2160",
"selresolution": "3840*2160",
"orientation": "Landscape"
}
}
],
"mouse": [
{
"description": "Mouse-1",
"usage duration": 120,
```

```
"inuse": true,
"External": true,
"Lastused" : "2023-02-01 09:01:15"
"capabilities": {
"MaxSpeed": "20",
"SelSpeed": "15"
}
}
],
"speakers":[
"description": "Speaker-1",
"usage duration": 30,
"inuse": true,
"External": false,
"Lastused" : "2023-01-15 20:01:15"
"capabilities": {
"Maxvolume": "20",
"Selvolume": "10"
}
}
]
}
}
```

Figure 5:
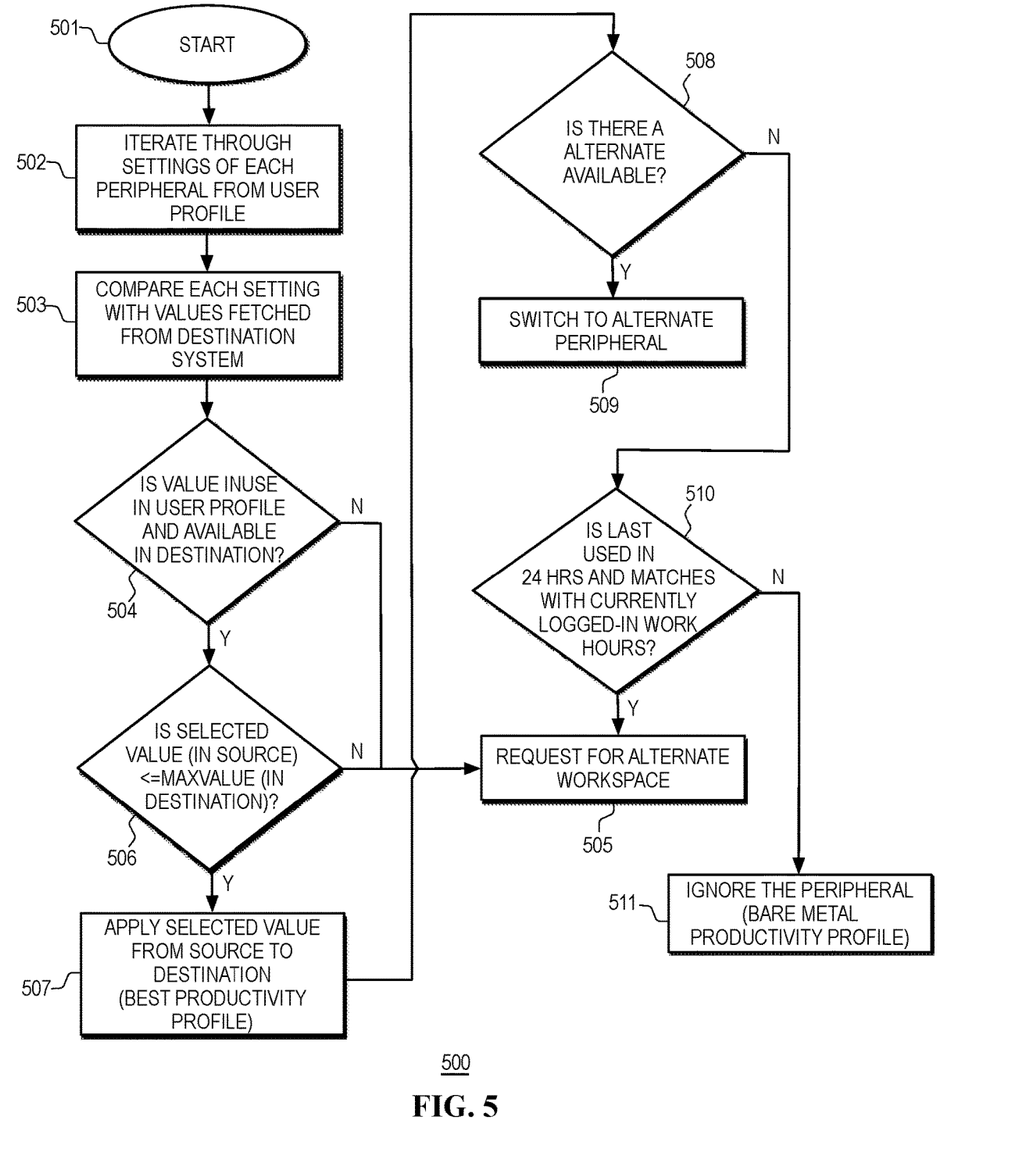
FIG. 5 depicts a flowchart of an example of a method for managing workspaces using productivity profiles, according to some embodiments.

FIG. 5 depicts a flowchart of an example of method 500 for managing workspaces using productivity profiles. In some embodiments, method 500 may be performed, at least in part, by system 300 in the course of managing workspaces.

Particularly, method 500 begins at 501. At 502, method 500 may include iterating through settings of each peripheral listed in a user's productivity profile. At 503, method 500 may include comparing each setting with values or capabilities fetched from a selected (e.g., destination) workspace or device.

At 504, if a value in use in the user profile is not available in the selected workspace, control passes to 505 where method 500 may request or generate a recommendation for an alternate workspace (e.g., an alternate destination). Conversely if the value is available, then at 506 method 500 may determine whether the profile value is smaller than or equal to the maximum value in the selected workspace. If not, control passes to 505. Otherwise, if the profile value is smaller than or equal to the maximum value in the selected workspace, then at 507 method 500 may apply the selected value from the source to the destination (e.g., Best Productivity Profile).

At 508, if there is an alternate workspace or peripheral available, at 509 method 500 may switch to the alternate. At 510, if there is no alternate available, method 500 may include determining whether a peripheral was last used (e.g., in the last 24 hrs.) and matches a current number of logged-in work hours. If so, control passes to 505. Otherwise, at 511, method 500 may ignore the peripheral and apply a simpler profile (e.g., Bare Metal Productivity Profile).

Figure 6:
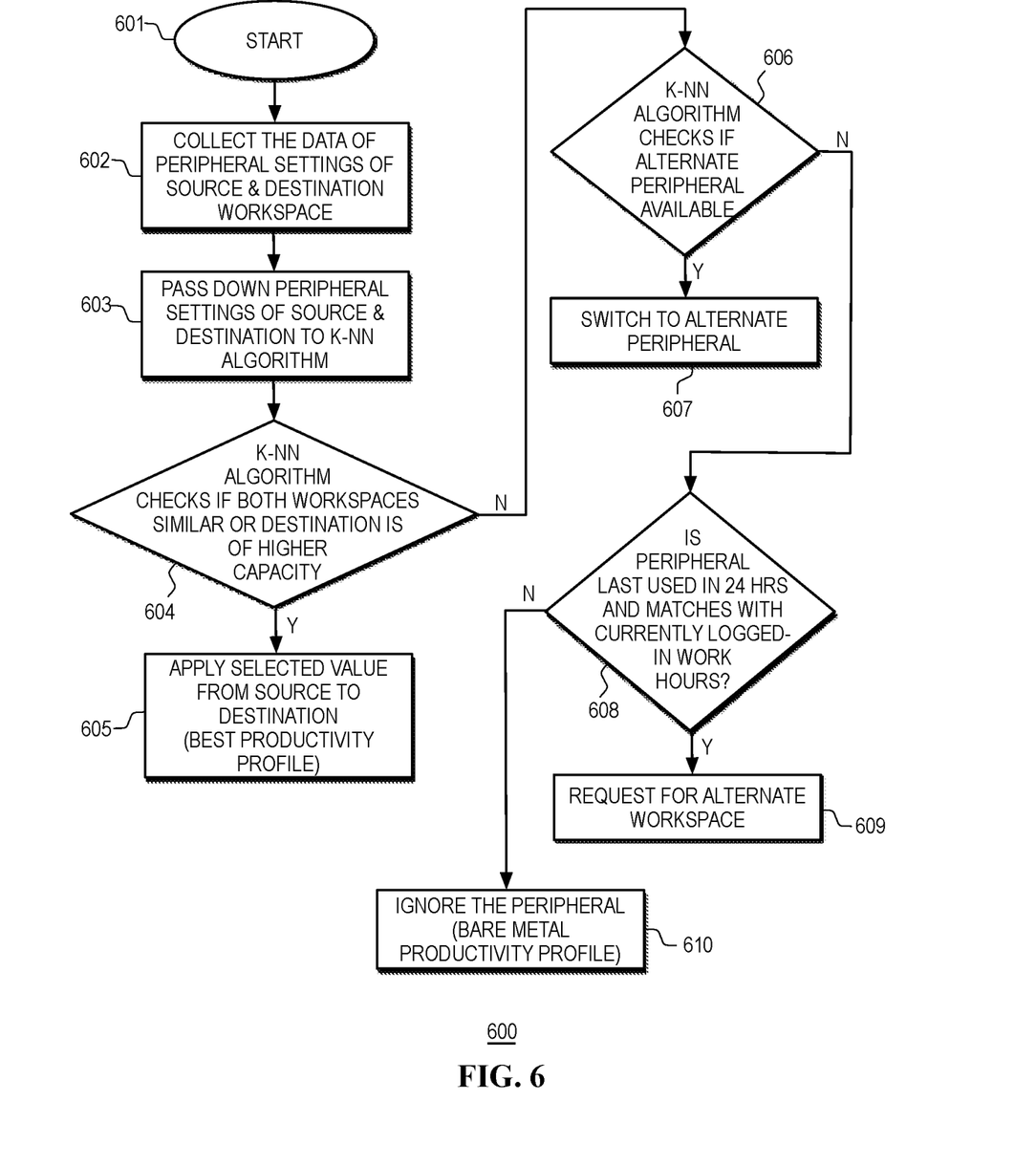
FIG. 6 depicts a flowchart of an example of a method for identifying a productivity profile using a k-nearest neighbors (k-NN) algorithm, according to some embodiments.

FIG. 6 depicts a flowchart of an example of method 600 for identifying a productivity profile using a k-nearest neighbors (k-NN) algorithm. In some embodiments, method 600 may be performed, at least in part, by cloud service 204 in the course of managing workspaces.

Specifically, method 600 begins at 601. At 602, method 600 may include collecting data of peripheral settings of the source (e.g., home) and destination (e.g., office) workspaces. At 603, method 600 may include passing down peripheral settings of the source and destination workspaces to a k-NN model or algorithm.

At 604, the K-NN model checks if both workspaces are similar or if the destination workspace has greater capabilities. If so, at 605 method 600 may apply a selected value from the source to the destination workspace (e.g., Best Productivity Profile). If not, control passes to 606.

At 606, method 600 may determine whether the k-NN algorithm indicates that an alternate peripheral device is available. If so, at 607 method 600 may switch to the alternate peripheral.

If not, at 608 method 600 may determine whether a peripheral was last used (e.g., in the last 24 hrs., last 48 hours, last 7 days, last month, etc.) and matches a current number of logged-in work hours. If so, control passes to 609 where method 600 may request or recommend an alternate workspace. Otherwise, at 610, method 600 may ignore the peripheral and apply a simpler profile (e.g., Bare Metal Productivity Profile).

For example, in a first use case, the user may have peripherals connected to IHS 100 in a home workspace, some of which are not used. In an office workspace, all the required peripherals are found, but the unused peripherals are not. As a result, a workspace recommendation may indicate that the unused peripherals be ignored, and that the user's Bare Metal Productivity profile be adopted.

In a second use case, the user may have peripherals connected in a home workspace, but used with lower capacity or configuration. In an office workspace, the required peripherals may be found with the same capacity or configuration used at home. As a result, a workspace recommendation may apply settings with available capabilities as per the user's Bare Metal Productivity profile.

In a third use case, the user may have peripherals at a home workspace, and alternate peripherals may be found in the office workspace. As such, a workspace recommendation may switch to the alternate peripheral using the user's Bare Metal Productivity profile.

In a fourth use case, the user may have peripherals connected but unused, and in the office workspace all peripherals may be found. Hence, a workspace recommendation may suggest that peripherals not used at home be used in the office, and it may apply a Best Productivity profile.

In a fifth use case, the user may have peripherals connected and used at home, but in the office the used peripherals may not be found. Accordingly, a workspace recommendation may suggest an alternate workspace (e.g., a different office or room in the same building), and it may apply a Best Productivity profile.

For instance, a user may be switched to a single monitor in the office which does not impact their productivity if they are not using dual monitors effectively at home. Additionally, or alternatively, the user may be switched to an audio headset in the office as a replacement for speakers used at home to maintain continued productivity between the two workspaces.

In sum, systems and methods described herein may be used for managing workspaces using productivity profiles. In various embodiments, these systems and methods may address workspace mismatches based on usage between hybrid physical workspaces and may create users' productivity profiles via software service at the endpoint which determines peripheral utilization pattern based, at least in part, upon usage duration of each peripheral.

These systems and methods may also derive and apply user productivity profiles for hybrid workspace environments via a cloud service to: determine Bare Metal Productivity Profile when there are lesser capabilities in workspaces (e.g., in terms of connected peripherals), determine the best possible productivity profile when there are the same or greater capabilities in workspaces, switch to an alternate productivity profile when moving from home to office environments (or vice-versa), and/or suggest alternate productivity workspaces when the user moves from home to their office.

In many implementations, systems and methods described herein may be incorporated into a wide range of electronic devices including, for example, computer systems or Information Technology (IT) products such as servers, desktops, laptops, memories, switches, routers, etc.; telecommunications hardware; consumer devices or appliances such as mobile phones, tablets, wearable devices, IoT devices, television sets, cameras, sound systems, etc.; scientific instrumentation; industrial robotics; medical or laboratory electronics such as imaging, diagnostic, or therapeutic equipment, etc.; transportation vehicles such as automobiles, buses, trucks, trains, watercraft, aircraft, etc.; military equipment, etc. More generally, these systems and methods may be incorporated into any device or system having one or more electronic parts or components.

To implement various operations described herein, computer program code (i.e., program instructions for carrying out these operations) may be written in any combination of one or more programming languages, including an object-oriented programming language such as Java, Smalltalk, Python, C++, or the like, conventional procedural programming languages, such as the "C" programming language or similar programming languages, or any of machine learning software. These program instructions may also be stored in a computer readable storage medium that can direct a computer system, other programmable data processing apparatus, controller, or other device to operate in a particular manner, such that the instructions stored in the computer readable medium produce an article of manufacture including instructions which implement the operations specified in the block diagram block or blocks. The program instructions may also be loaded onto a computer, other programmable data processing apparatus, controller, or other device to cause a series of operations to be performed on the computer, or other programmable apparatus or devices, to produce a computer implemented process such that the instructions upon execution provide processes for implementing the operations specified in the block diagram block or blocks.

Modules implemented in software for execution by various types of processors may, for instance, include one or more physical or logical blocks of computer instructions, which may, for instance, be organized as an object or procedure. Nevertheless, the executables of an identified module need not be physically located together but may include disparate instructions stored in different locations which, when joined logically together, include the module and achieve the stated purpose for the module. Indeed, a module of executable code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices.

Reference is made herein to "configuring" a device or a device "configured to" perform some operation(s). It should be understood that this may include selecting predefined logic blocks and logically associating them. It may also include programming computer software-based logic of a retrofit control device, wiring discrete hardware components, or a combination of thereof. Such configured devices are physically designed to perform the specified operation(s).

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

The invention claimed is:

1. An Information Handling System (IHS), comprising:
a processor; and
a memory coupled to the processor, the memory having program instructions stored thereon that, upon execution, cause the IHS to:
in response to detection of a workspace change comprising connection of a peripheral device to the IHS, automatically send a user's productivity profile to a remote service, wherein the productivity profile is created based, at least in part, upon a utilization of the peripheral device when the IHS is deployed in a first workspace;
in response to the peripheral device being utilized above a threshold, add an indication of the utilization to the user's productivity profile; and
receive, from the remote service, a recommendation to deploy the IHS in a selected workspace, wherein the recommendation is produced based, at least in part, upon a comparison between the user's productivity profile and a set of capabilities of the selected workspace.

2. The IHS of claim 1, wherein the peripheral device comprises at least one of: a docking station, a display, a projector, a camera, a microphone, a loudspeaker, headphones, a keyboard, a mouse, a scanner, a printer, or a tablet.

3. The IHS of claim 1, wherein the program instructions, upon execution, further cause the IHS to monitor the utilization of the peripheral device via a port selected from the group consisting of: Universal Serial Bus (USB) Type-A, USB Type-B, USB Type-C, Lightning, Firewire, Thunderbolt, DisplayPort, High-Definition Multimedia Interface (HDMI), Digital Visual Interface (DVI), and Serial Advanced Technology Attachment (SATA).

4. The IHS of claim 1, wherein the first workspace comprises a home, and wherein the selected workspace is selected among a plurality of work desks, offices, rooms, or cubicles.

5. The IHS of claim 1, wherein the program instructions, upon execution, further cause the IHS to monitor the utilization of the peripheral device via a composite peripheral device comprising a plurality of ports.

6. The IHS of claim 5, wherein the composite peripheral device comprises at least one of: a docking station, a display, or a hub.

7. The IHS of claim 1, wherein the workspace change further comprises disconnection of a peripheral device from the IHS, and wherein the program instructions, upon execution, further cause the IHS to, in response to detection of the workspace change, notify the remote service of the workspace change.

8. The IHS of claim 1, wherein, in response to an indication in the user's productivity profile that the utilization of the peripheral device is above a threshold amount, determine that the selected workspace has an instance of the peripheral device.

9. The IHS of claim 1, wherein, in response to an indication in the user's productivity profile that the utilization of the peripheral device is not above a threshold amount, determine that the selected workspace does not have an instance of the peripheral device.

10. The IHS of claim 1, wherein, in response to an indication in the user's productivity profile that the peripheral device is utilized with a given setting, determine that the selected workspace has an alternate peripheral device with the given setting.

11. The IHS of claim 10, wherein the given setting comprises a display resolution.

12. The IHS of claim 1, wherein the program instructions, upon execution, further cause the IHS to, in response to an indication that: (i) the peripheral device is utilized with a setting, and (ii) the selected workspace does not have another instance of the peripheral device nor an alternate peripheral device with the setting, receive a recommendation to change a configuration of the selected workspace.

13. A method, comprising:
receiving, at a remote service from an Information Handling System (IHS), in automatic response to the IHS detecting a workspace change in a first workspace, the workspace change comprising connection of a peripheral device to the IHS, a user's productivity profile created by the IHS based, at least in part, upon user utilization of the peripheral device when the IHS is deployed in the first workspace, wherein in response to the peripheral device utilization meeting a high-utilization criteria, the peripheral device is indicated as belonging to a primary productivity profile; and providing, from the remote service to the user, a recommendation to deploy the IHS in a selected workspace, wherein the recommendation is produced based, at least in part, upon a comparison between a productivity profile of the user and a set of capabilities of the selected workspace.

14. The method of claim 13, wherein the workspace change further comprises disconnection of a peripheral device from the IHS, wherein in response to the IHS detecting the workspace change, the method further comprises receiving by the remote service from the IHS a notification of the change based at least in part upon a workspace recalculation by the IHS, wherein the workspace recalculation is triggered by the workspace change, and wherein the workspace recalculation further comprises prioritizing peripherals in descending order of usage duration supplemented with usage frequency and last time used, using an Artificial Intelligence (AI) or Machine Learning (ML) algorithm.

15. The method of claim 14, wherein in response to the peripheral device utilization not meeting the high-utilization criteria but meeting a low-utilization criteria, the peripheral device is indicated as belonging to a secondary productivity profile.

16. The method of claim 15, wherein the selected workspace is chosen based, at least in part, upon whether the selected workspace matches the primary productivity profile, and, if not, whether the selected workspace matches the secondary productivity profile.

17. A memory storage device having program instructions stored thereon that, upon execution by a processor, cause the processor to:

in response to detection of a workspace change comprising connection of a peripheral device to an Information Handling System (IHS), automatically create by the IHS a user's productivity profile based, at least in part, upon user utilization of the peripheral device when an the IHS is deployed in a first workspace, wherein in response to the peripheral device utilization meeting a high-utilization criteria, the peripheral device is indicated as belonging to a primary productivity profile; and handle a recommendation that the IHS be deployed in a selected one of a plurality of workspaces, wherein the recommendation is produced based, at least in part, upon a comparison between the user's productivity profile and sets of capabilities of each of the plurality of workspaces.

18. The memory storage device of claim 17, wherein the workspace change further comprises disconnection of a peripheral device from the IHS, wherein in response to the IHS detecting the workspace change, the program instructions further cause the IHS to send, to a remote service, a notification of the change based at least in part upon a workspace recalculation triggered by the workspace change, wherein the workspace recalculation further comprises ranking peripherals according to usage duration, usage frequency, and last time of use, categorizing peripherals used a longer duration and/or more recently as comprising a bare metal productivity profile, and categorizing peripherals used a shorter duration and/or rarely as comprising a best productivity profile.

19. The memory storage device of claim 17, wherein in response to the peripheral device utilization not meeting the high-utilization criteria but meeting a low-utilization criteria, the peripheral device is indicated as belonging to a secondary productivity profile.

20. The memory storage device of claim 19, wherein the recommendation is produced based, at least in part, upon whether the selected workspace matches the primary productivity profile, and, if not, whether the selected workspace matches the secondary productivity profile.

* * * * *